US007952753B2

(12) United States Patent
Bai et al.

(10) Patent No.: US 7,952,753 B2
(45) Date of Patent: May 31, 2011

(54) SYSTEM AND METHOD FOR REPLACING BINARY LEVEL MASKS IN A PAGE DESCRIPTION

(75) Inventors: Yingjun Bai, Pittsford, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1297 days.

(21) Appl. No.: 11/518,160

(22) Filed: Sep. 11, 2006

(65) Prior Publication Data

US 2008/0062447 A1    Mar. 13, 2008

(51) Int. Cl.
*G06F 15/00* (2006.01)
(52) U.S. Cl. ........ 358/1.9; 358/3.28; 382/144; 382/167; 382/212; 382/213
(58) Field of Classification Search .................... 358/1.9, 358/3.06, 3.14, 3.22; 382/167, 144, 212, 382/213
See application file for complete search history.

(56) References Cited

U.S. PATENT DOCUMENTS

| | | | | |
|---|---|---|---|---|
| 5,081,529 A | * | 1/1992 | Collette | 358/504 |
| 5,313,287 A | * | 5/1994 | Barton | 382/252 |
| 5,673,121 A | * | 9/1997 | Wang | 358/3.23 |
| 5,694,224 A | * | 12/1997 | Tai | 358/3.01 |
| 5,701,401 A | * | 12/1997 | Harrington et al. | 358/1.9 |
| 5,710,827 A | * | 1/1998 | Perumal et al. | 382/167 |
| 5,790,703 A | * | 8/1998 | Wang | 358/3.28 |
| 5,812,744 A | * | 9/1998 | Allebach et al. | 358/1.9 |
| 6,067,406 A | * | 5/2000 | Van Hoof et al. | 358/1.9 |
| 6,208,431 B1 | * | 3/2001 | Lee et al. | 358/1.9 |
| 6,731,409 B2 | * | 5/2004 | Wang | 358/3.28 |
| 2006/0192983 A1 | * | 8/2006 | Groarke et al. | 358/1.9 |

* cited by examiner

*Primary Examiner* — Twyler L Haskins
*Assistant Examiner* — Dennis Dicker
(74) *Attorney, Agent, or Firm* — Pillsbury Winthrop Shaw Pittman LLP

(57) ABSTRACT

A system and method for rendering an image file for outputting a copy of an image represented by the image file. In some embodiments, rendering the image includes generating an output file, such as an output bitmap based on a predetermined halftone. In one embodiment, the system comprises an input module, and a processor. The input module obtains a page description of the image to be output. In some instances, the page description includes one or more level masks designed to impart corresponding transparency levels to one or more objects in the page description. The processor (i) detects the one or more level masks in the page description, (ii) determines the one or more corresponding transparency levels of the one or more detected level masks, (iii) obtains one or more custom masks that correspond to the same one or more transparency levels as the one or more detected level masks, wherein the one or more custom masks are designed based on the predetermined halftone, and (iv) replaces the one or more level masks in the page description with the corresponding one or more custom masks.

18 Claims, 2 Drawing Sheets

SYSTEM AND METHOD FOR REPLACING BINARY LEVEL MASKS IN A PAGE DESCRIPTION

FIELD

The disclosure relates generally to a system and method for rendering an image for output, and more specifically to replacing level masks present in a page description of the image with custom masks in order to enhance the output of a copy of the image.

BACKGROUND

Some commercial software, such as the Microsoft™ Office suite of software, enables the creation of image files that include objects that have different levels of transparency that are represented by an increase or decrease in the shade of the objects. In order to output a copy of an image represented by one of these image files, these applications typically generate a page description that represents the image. Typically, the page description will include one or more binary level masks tiled over color value (i.e., hue) information to lighten the shade of the color value information in accordance with the transparency level dictated by the image file.

In conventional implementations, a network controller of a printing device receives the page description and generates an output file, such as a bitmap, that represents the image. In generating the bitmap, the network controller halftones the color value information included in the page description to provide a pixel by pixel map of where color should be applied to the output copy of the image. In some instances, the binary level masks included in the page description and the color value halftone used to generate the output file interact to introduce undesirable artifacts into the output file that are then included in the copy of the image that is output based on the output file. For example, one or more properties of the binary level masks and the color value halftone may correlate to cause beating and/or other artifacts. The one or more properties that may correlate include periodicity, density, angle, distribution pattern and/or other properties of the binary level masks and the color value halftone. Since different output devices implement patterns of color value halftone with different properties, it may not be practicable to design a single set of binary level masks with properties that will not cause degradation of an output image through interaction with color value halftone for different output devices.

These and other drawbacks with conventional systems are addressed by the following disclosure.

SUMMARY

One aspect of the disclosure relates to a system that is adapted to render an image file that represents an image for output by a printing device, the printing device having a predetermined halftone. In one embodiment, the system comprises an input module, a mask detection module, a level determination module, a custom mask module, and a mask replacement module. The input module obtains a page description of an image to be output by the printing device. The mask detection module detects the presence of one or more level masks in the page description, wherein each of the one or more level masks is designed to impart a corresponding transparency level to one or more objects in the page description. The level determination module determines the one or more corresponding transparency levels of the one or more detected level masks. The custom mask module obtains one or more custom masks that correspond to the same one or more transparency levels as the one or more detected level masks, wherein the one or more custom masks are designed based on the predetermined halftone of the printing device. The mask replacement module replaces the one or more level masks in the page description with the corresponding one or more custom masks.

Another aspect of the disclosure relates to a method of rendering an image file that represents an image for output by a printing device, the printing device having a predetermined halftone. In one embodiment, the method comprises obtaining a page description of an image to be output by the printing device; detecting the presence of one or more level masks in the page description, wherein each of the one or more detected level masks is designed to impart a corresponding transparency level to one or more objects in the page description; determining the one or more corresponding transparency levels of the one or more detected level masks; obtaining one or more custom masks that correspond to the same one or more transparency levels as the one or more detected level masks, wherein the one or more custom masks are designed based on the predetermined halftone of the printing device; and replacing the one or more level masks in the page description with the corresponding one or more custom masks.

Yet another aspect of the disclosure relates to a printing device. In one embodiment, the device comprises a halftone library, a communication port, a processor, and an output module. The halftone library stores a halftone implemented by the device to produce a plurality of colors having different color values. The communication port obtains a page description of an image to be output. In some instances, the page description includes one or more level masks designed to impart corresponding transparency levels to one or more objects in the page description. The processor (i) detects the one or more level masks in the page description, (ii) determines the one or more corresponding transparency levels of the one or more detected level masks, (iii) obtains one or more custom masks that correspond to the same one or more transparency levels as the one or more detected level masks, wherein the one or more custom masks are designed based on the halftone stored by the halftone library, and (iv) replaces the one or more level masks in the page description with the corresponding one or more custom masks. The output module generates a printed copy of the image based on the page description that includes the one or more custom masks.

DETAILED DESCRIPTION

Figure 1:
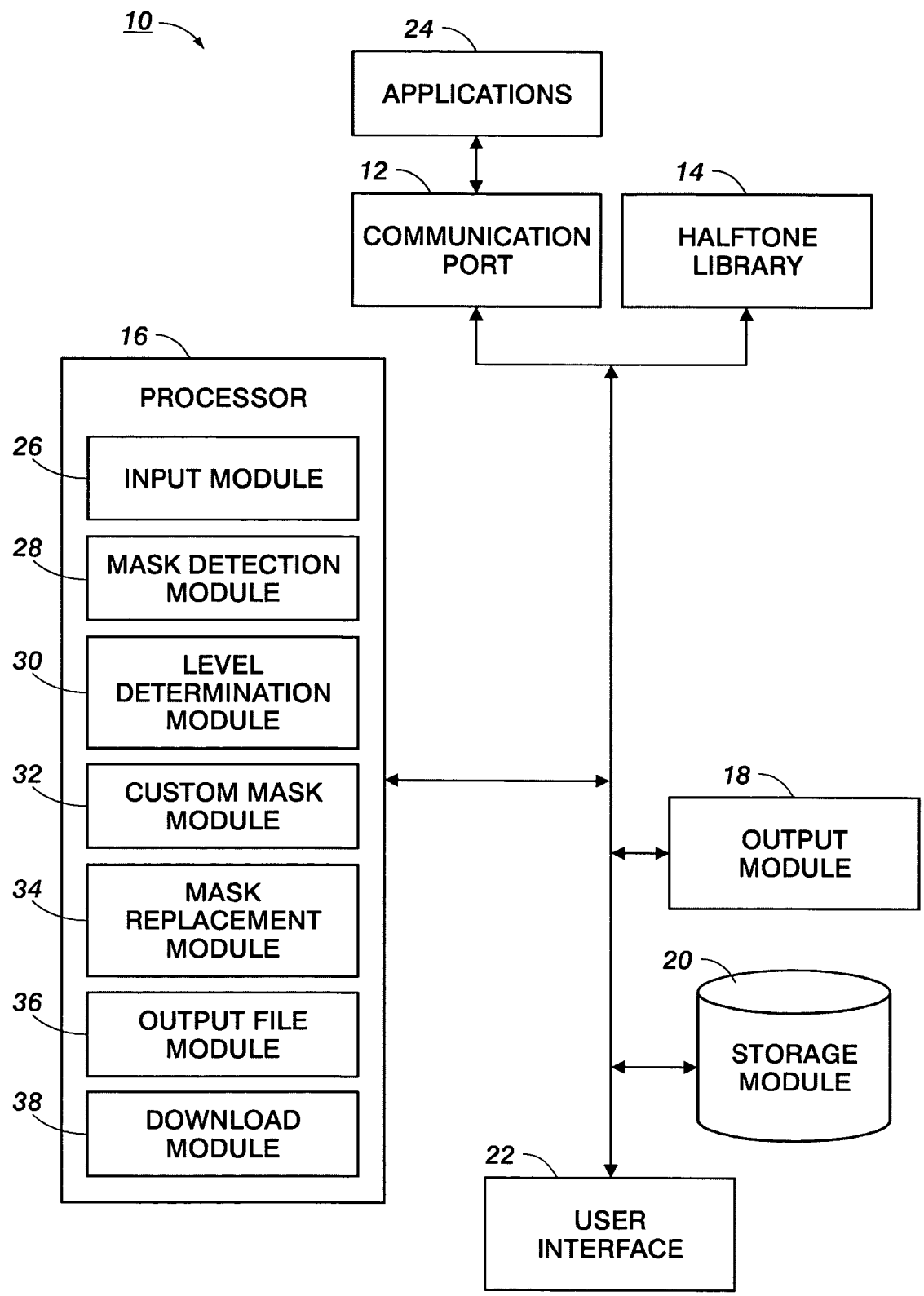
FIG. 1 illustrates a system adapted to render an image for output.

FIG. 1 illustrates a system 10 adapted to render an image for output, and output a printed copy of the image. In one embodiment, system 10 includes a communication port 12, a halftone library 14, a processor 16, an output module 18, a storage module 20, and a user interface 22. The image may be derived from an image file generated by one or more applications 24 in communication with system 10.

Applications 24 may include any application capable of generating, viewing, manipulating, or transmitting an image file. For example, applications 24 may include an application from the Microsoft™ Office suite of applications, or other applications. Applications 24 may further include one or more print drivers operable with applications in which image files are generated, viewed, manipulated, or transmitted. Other applications are also contemplated as applications 24.

To initiate the output of a copy of an image, applications 24 generate a page description of the image to be output. The page description describes the contents of the image to be output at a higher level than an output file (e.g., an output bitmap) used by output module 18 to generate the copy of the image represented by the page description.

The page description may be in any page description language, such as PostScript, Portable Document Format, Printer Command Language, and/or any other page description language. The page description of the image to be output typically includes color value information and transparency level information associated with one or more of objects in the image. As used herein, color value information refers to information that describes the color without any transparency effect. For instance, hue may be described using coordinates in a multi-dimensional color space such as an RGB color space or a CMYK color space. As used herein, transparency level information refers to shade or transparency of underlying color value (e.g., a lightness or darkness of a color) required by applications 24.

In some instances, when applications 24 generate the page description, the transparency level of one or more objects in the image represented by the page description may be described using binary level masks that are tiled over the color value information of the objects. In these level masks, individual areas (e.g., pixels) are associated with one of the two binary values. Areas associated with one of the binary values, 1 for example, are assigned as areas not to be provided with color while the areas associated with the other binary value (e.g., 0) are to be provided with the opaque color dictated by the color value information of the object. As should be appreciated, as the transparency level of an object becomes more opaque (e.g., darker, less transparent, etc.), the density of the areas of the object to be provided with the appropriate opaque color value increases, and the opposite holds as the transparency level of the object becomes less opaque. The individual areas of these binary level masks are assigned binary values (e.g., 1's and 0's) on a periodic basis.

Communication port 12 enables system 10 to receive and transmit information to and from applications 24 and/or other entities. For example, over communication port 12 system 10 may obtain a page description of an image to be output from applications 24. Communication port 12 enables system 10 to receive and/or transmit information via one or more operative communication links. For example, communication port 12 may enable wireless communication, wired communication, communication via a discrete connection, communication via a network, and/or other operative communication links.

Output module 18 is capable of outputting (e.g., by printing) a copy of an image based on an output file, such as an output bitmap or other output file. For example, in one embodiment, output module 18 may print a copy of the image by providing ink to a base medium (e.g., paper, etc.) in accordance with the image represented by the output file. In this embodiment, output module may include an inkjet printing module, a laserjet printing module, a dot matrix printing module, and/or other printing modules. In other embodiments, output module 18 may print a copy of the image via another mechanism, such as engraving, embossing, etc. In other embodiments, output module 18 may output a copy of the image electronically (e.g., by electronic display, etc.).

Processor 16 provides various functionalities with respect to system 10. For example, as is discussed further below, processor 16 typically converts the page description that is received from applications 24 into the output file that is used by output module to output a copy of the image represented by the page description.

Halftone library 14 stores one or more halftone thresholding arrays. The one or more halftone thresholding arrays are used to determine a halftone used by processor 16 to convert the page description to the output file. More particularly, the halftone is used by processor 16 to convert color values of objects in the page description to an appropriate map of colored and uncolored areas in the output file. For example, if the page description describes the color value of a particular object in the image as yellow, the output file usually does not specify that the entire object should be provided with yellow color. Instead, a binary pattern is created over the object, based on the halftone for yellow, that specifies areas on the object that are to receive color and areas that are not to receive color.

It should be appreciated that in some instances the binary patterns created by processor 16 as halftone of the color value information included in the page description are not coordinated with the binary level masks provided to the page description by applications 24. Thus, in some cases an object in the image being output may be subject to both a halftone of the color value the object and a binary level mask corresponding to the transparency level of the object that are not coordinated. In these cases, interaction between a halftone for a given color value in the image and a binary level mask applied to the same area may create artifacts in the portion of the output file that represents the object, and visual artifacts in the copy of the image that is output based on the output file. As used herein an artifact (or visual artifact) refers to one or more structures or features not present in the image represented by the image file generated by applications 24, but visible in downstream from the image file (e.g., in the page description, in the output file, in the copy that is output, etc.) as a result of processing by applications 24, processor 16, and/or other entities for output. In some instances, correlations between the periodicity, density, angle, distribution pattern and/or other properties of the halftone and overlaid binary level mask may beat to cause artifacts in the output file and or the output copy of the image.

As an example, consider a case in which the halftone for the color value yellow that is used by processor 16 to generate the output file is 212 lines per inch ("lpi") at 45 degrees and the binary level mask provided by applications 24 for a 50% transparency effect (or transparency level) has substantially the same geometry (e.g., a 212 lpi 45 degree checkerboard). If the halftone and the level mask are aligned, then the level mask will have no lightening impact on the transparency level of the output object. Further, if the halftone and the level mask are 180 degrees out of phase, then the object will receive no color at all. While this is a relatively extreme case, it serves to illustrate the phenomenon of beating between the halftone and the level mask. It should be appreciated that beating may also be present in cases where the correspondence between the patterns is not identical.

In some instances, in an attempt to avoid artifacts caused by interaction between level masks and halftone, applications 24 may generate the page description such that where multiple objects in the image represented by the page description have the same (or substantially the same) transparency level, the binary level masks for each of the multiple objects with the common transparency level are offset by a different phase shift. While this solution may reduce artifacts in some cases, it may cause the multiple objects to ultimately be output with what appears to be different transparency levels (when the transparency levels should be the same). This should be apparent from the example provided in the preceding paragraph, where a phase shift to the binary level mask applied to two objects with yellow color values and 50% transparency levels might cause the two objects to be output with very different transparency levels.

As is discussed further below, in order to reduce the artifacts caused by interaction between color value halftone and binary level masks, processor 16 may replace the binary level masks included in the page description by applications 24 with custom masks that are designed based on the color value halftone that corresponds to the one or more halftone thresholding arrays stored in halftone library 14. In one embodiment, processor 16 includes an input module 26, mask detection module 28, a level determination module 30, a custom mask module 32, a mask replacement module 34, an output file module 36, and a download module 38. Modules 26, 28, 30, 32, 34, 36, and 38 may be implemented in software; hardware; firmware; some combination of software, hardware, and/or firmware; and/or otherwise implemented. It should be appreciated that although modules 26, 28, 30, 32, 34, 36, and 38 are illustrated in FIG. 1 as being co-located within a single processing unit, processor 16 may include multiple processing units, and that some of these processing units may be located remotely from each other. In such embodiments, one or more of modules 26, 28, 30, 32, 34, 36, and 38 may be located remotely from the other modules and operative communication between the modules may be achieved via one or more communication links. Such communication links may be wireless or hard wired.

Input module 26 obtains a page description of an image to be output by output module 18. In the illustration of system 10 provided in FIG. 1, the page description has been generated by applications 24. In one embodiment, input module 26 is in communication with communication port 12, and the page description is transmitted from applications 24 to input module 26 via communication port 12.

Mask detection module 28 analyzes the page description obtained by input module 26 to detect the presence of one or more level masks in the page description. In one embodiment, mask detection module 28 is capable of detecting the binary level masks included in the page description by applications 24. As was discussed above, any level masks detected by mask detection module 28 correspond to transparency levels within the image represented by the page description.

Level determination module 30 determines transparency levels that correspond to color masks in the page description obtained by input module 26. In one embodiment, level determination module 30 analyzes the level masks detected by mask detection module 28 to determine the transparency levels that correspond to the detected level masks.

Custom mask module 32 obtains custom masks that correspond to the same transparency levels as the detected level masks. The custom masks obtained by custom mask module 32 are designed based on the color value halftone that corresponds to the one or more halftone thresholding arrays stored in halftone library 14. More specifically, in some embodiments the custom masks are designed to reduce visual artifacts (e.g., beating, etc.) caused by interaction between the level masks in the page description and the halftone used to generate the output file representing the image. In other words, the custom masks correspond to the same levels as the binary level masks included in the page description by applications 24, but the properties of the custom masks (e.g., periodicity, density, distribution pattern, angle, etc.) are designed based on the properties of the color value halftone that will be used to generate the output file such that interaction between the custom masks and the color value halftone will not substantially degrade the output copy of the image in the manner discussed above.

In some embodiments, custom mask module 32 receives the determined transparency levels present in the image from level determination module 30 and then obtains custom masks that correspond to the determined transparency levels in a stored library of custom masks. The stored library of custom masks may include a plurality of custom masks that correspond to a plurality of transparency levels. In one embodiment, the library of custom masks is stored in storage module 20. Storage module 20 may include a medium capable of storing the library of masks, including an electronically readable medium such as a magnetic medium (e.g., a hard drive), a solid-state memory medium, an optical medium (e.g., optical disk(s)), and/or other electronically readable media. In one embodiment, download module 36 controls the downloading, organization, and/or other aspects of the storage of custom masks in the stored library of masks.

In another embodiment, custom mask module 32 may obtain the custom masks by dynamically generating the custom masks based on a mask halftone thresholding array. In this embodiment, the mask halftone thresholding array is designed to interact with the color value halftone used to generate the output file without substantially degrading the copy of the image represented by the output file. Custom mask module 32 uses the mask halftone thresholding array to generate a custom mask for each of the binary level masks detected by mask detection module 28 at the corresponding transparency level, as determined by level determination module 30. The mask halftone thresholding array may be stored either in storage module 20 or halftone library 14, among other places. The downloading of the mask halftone thresholding array to system 10 is controlled by download module 36.

Mask replacement module 34 replaces the one or more level masks in the page description with the corresponding one or more custom masks obtained by custom mask module 32. In one embodiment, this includes removing the binary level mask(s) included in the page description by applications 24 and tiling the custom mask(s) obtained by custom mask module 32 over the color value information included in the page description in place of the binary level mask(s).

Output file module 38 receives the page description from mask replacement module 34 and generates the output file used to output a copy of image represented by the page description. Output file module 38 generates the output file based on the page description and the color value halftone provided by the halftone thresholding array(s) stored in halftone library 14. Since the output file is generated by output file module 38 based on the page description that includes the custom masks obtained by custom mask module 32, the copy of the image that is output in accordance with the output file should be relatively free of degradation caused by interaction between the level masks (in this case the custom masks) and the color value halftone.

User interface 22 enables a user to control various aspects of system 10. For example, in one embodiment, user interface 22 enables a user to activate and/or deactivate the substitution of custom masks in the page description for the binary level masks included in the page description by applications 24. In this embodiment, when the user activates this functionality modules 26, 28, 30, 32, 34, 36, and 38 operate substantially as described above. However, when the user deactivates this functionality, via user interface 22, output file module 38 generates the output file based on the page description as it is generated by applications 24 (e.g., with the binary level masks). In other words, when the user deactivates the above-mentioned functionality, mask replacement module 34 does not replace the binary level masks included in the page description by applications 24 with custom masks obtained by custom mask module 32.

It should be apparent that system 10, as illustrated in FIG. 1 and described above, may be embodied in a number of possible configurations without departing from the scope of the disclosure included herein. For example, in one configuration, system 10 may be embodied within a single device, such as a printing device, that includes all of communication port 12, halftone library 14, processor 16, output module 18, storage module 20, and user interface 22. In other configurations, the components of system 10 may be implemented on a plurality of devices such as an output device (e.g., a printing device) and a client computer that is operatively linked to the output device. One possible example of such a configuration may include an arrangement wherein the functionality of processor 16 is provided by more than one processing unit acting in concert, including one or more processing units disposed within the output device and one or more processing units disposed within the client computer.

Figure 2:
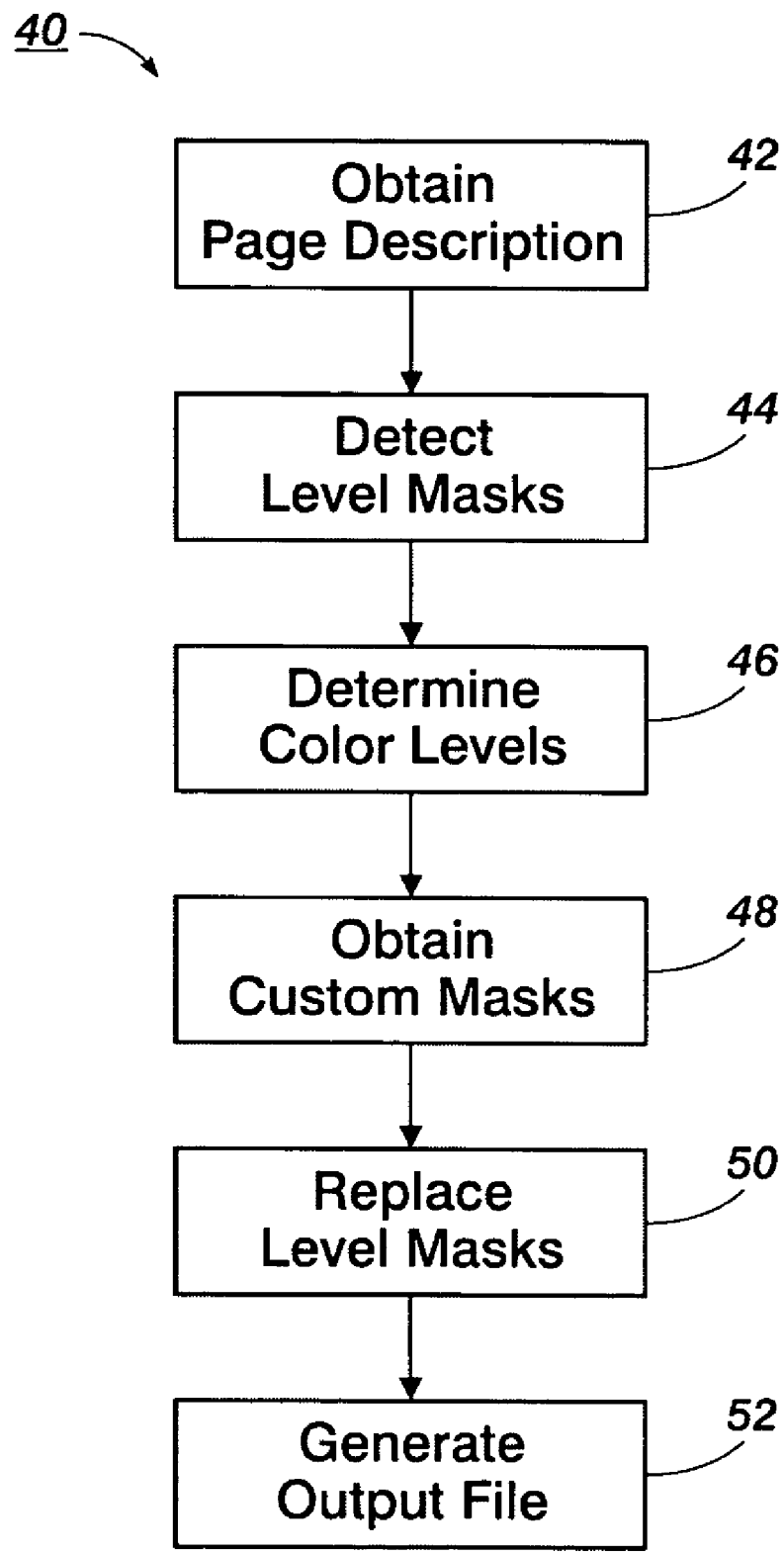
FIG. 2 illustrates a method of rendering an image for output.

FIG. 2 illustrates a method 40 of rendering an image file that represents an image for output. In some embodiments, method 40 may be executed by various components of system 10 described above. However, these embodiments are not limiting, and other systems for implementing method 40 exist.

Method 40 includes an operation 42 at which a page description of an image to be output is obtained. The page description may be obtained from one or more applications (e.g., applications 24) capable of generating, viewing, manipulating, or transmitting an image file. In one embodiment, operation 42 is executed by input module 26 (as shown in FIG. 1) in the manner described above.

At an operation 44, the page description obtained at operation 42 is analyzed to detect the presence of one or more level masks in the page description. The level masks correspond to transparency levels, as described above. In some instances, the level masks include binary masks generated and included in the page description by applications 24 by tiling the binary level masks on top of color value information. In one embodiment, operation 44 is executed by mask detection module 28 (see FIG. 1) as discussed previously.

Once the level masks in the page description have been detected at operation 44, the one or more transparency levels that correspond to the detected level masks are determined at an operation 46. In one embodiment, operation 46 is executed by level determination module 30 (as illustrated in FIG. 1) as was described above.

At an operation 48, one or more custom masks that correspond to the same one or more transparency levels (as determined at operation 46) as the one or more level masks detected at operation 44 are obtained. The custom masks are designed based on the predetermined halftone of the printing device to reduce artifacts present in the output of the image caused by interaction (e.g., beating) between (i) color value halftone used to generate an output file from the page description and (ii) the level masks. In some instances, the custom masks are obtained from a plurality of custom masks, such as a stored custom mask library. In other instances, the custom masks are determined based on the transparency levels determined at operation 46 and a stored mask halftone thresholding array. In one embodiment, operation 48 is executed by custom mask module 32 (see FIG. 1) as has been discussed above.

At an operation 50, the level masks in the page description detected at operation 44 are replaced by the custom masks obtained at operation 48. In one embodiment, operation 50 is performed by mask replacement module 34 (as shown in FIG. 1) as was described previously.

At an operation 52, an output file (e.g., an output bitmap, etc.) is generated from the page description that includes the custom masks that were placed in the page description at operation 50. In one embodiment, operation 52 is executed by output file module 38 (see FIG. 1) in the manner set forth above.

While the subject matter of this application has been described in conjunction with the specific embodiments outlined above, it is evident that many alternatives, modifications and variations will be apparent to those skilled in the art. Accordingly, the preferred embodiments as set forth above are intended to be illustrative, not limiting. Various changes may be made without departing from the spirit and scope of the following claims.

What is claimed is:

1. A system adapted to render an image file that represents an image for output by a printing device, the printing device having a predetermined halftone including halftone thresholding arrays used to convert color value information into binary pixel-based information, the system comprising:
   an input module that obtains a page description of an image to be output by the printing device;
   a mask detection module that detects the presence of one or more binary level masks in the page description, wherein each of the one or more binary level masks is designed to impart a corresponding transparency level to one or more objects in the page description;
   a level determination module that determines the one or more corresponding transparency levels of the one or more detected binary level masks;
   a custom mask module that obtains one or more binary custom masks that correspond to the same one or more transparency levels as the one or more detected binary level masks, wherein the one or more binary custom masks are designed based on the predetermined halftone of the printing device; and
   a mask replacement module that replaces the one or more binary level masks in the page description with the corresponding one or more binary custom masks.

2. The system of claim 1, further comprising a storage module that stores a plurality of binary custom masks corresponding to a plurality of transparency levels, and wherein the custom mask module is adapted to obtain binary custom masks from the plurality of binary custom masks stored by the storage module.

3. The system of claim 2, further comprising a download module that downloads binary custom masks to the storage module.

4. The system of claim 1, further comprising a storage module that stores the predetermined halftone, and wherein the custom mask module obtains the one or more binary custom masks by determining the one or more binary custom masks based on (i) the one or more transparency levels determined by the level determination module and (ii) a halftone thresholding array in the predetermined halftone stored by the storage module.

5. The system of claim 1, wherein the one or more binary custom masks are designed based on the predetermined halftone to reduce artifacts present in the output of the image caused by beating between the predetermined halftone and the one or more binary level masks in the page description.

6. A system adapted to render an image file that represents an image for output by a printing device, the printing device having a predetermined halftone, the system comprising:

an input module that obtains a page description of an image to be output by the printing device;

a mask detection module that detects the presence of one or more level masks in the page description, wherein each of the one or more level masks is designed to impart a corresponding transparency level to one or more objects in the page description;

a level determination module that determines the one or more corresponding transparency levels of the one or more detected level masks;

a custom mask module that obtains one or more custom masks that correspond to the same one or more transparency levels as the one or more detected level masks, wherein the one or more custom masks are designed based on the predetermined halftone of the printing device;

a mask replacement module that replaces the one or more level masks in the page description with the corresponding one or more custom masks; and a user interface module that enables a user to activate and/or deactivate the mask replacement module such that if the mask replacement module is deactivated the one or more level masks in the page description are not replaced with corresponding custom masks, and if the mask replacement module is activated, the one or more level masks in the page description are replaced with corresponding custom masks.

7. A method of rendering an image file that represents an image for output by a printing device, the printing device having a predetermined halftone including halftone thresholding arrays used to convert color value information into binary pixel-based information, the method comprising:

obtaining a page description of an image to be output by the printing device;

detecting the presence of one or more binary level masks in the page description, wherein each of the one or more detected binary level masks is designed to impart a corresponding transparency level to one or more objects in the page description;

determining the one or more corresponding transparency levels of the one or more detected binary level masks;

obtaining one or more binary custom masks that correspond to the same one or more transparency levels as the one or more detected binary level masks, wherein the one or more binary custom masks are designed based on the predetermined halftone of the printing device; and replacing the one or more binary level masks in the page description with the corresponding one or more binary custom masks.

8. The method of claim 7, further comprising storing a plurality of binary custom masks corresponding to a plurality of transparency levels, and wherein obtaining one or more custom masks comprises obtaining binary custom masks from the stored plurality of binary custom masks.

9. The method of claim 8, further comprising downloading binary custom masks to be included in the stored plurality of binary custom masks.

10. The method of claim 7, further comprising storing the predetermined halftone, and wherein obtaining one or more binary custom masks comprises determining the one or more binary custom masks based on (i) the determined transparency levels and (ii) a halftone thresholding array included in the predetermined halftone.

11. The method of claim 7, wherein the one or more binary custom masks are designed based on the predetermined halftone to reduce artifacts present in the output of the image caused by beating between the predetermined halftone and the one or more binary level masks in the page description.

12. A method of rendering an image file that represents an image for output by a printing device, the printing device having a predetermined halftone, the method comprising:

obtaining a page description of an image to be output by the printing device;

detecting the presence of one or more level masks in the page description, wherein each of the one or more detected level masks is designed to impart a corresponding transparency level to one or more objects in the page description;

determining the one or more corresponding transparency levels of the one or more detected level masks;

obtaining one or more custom masks that correspond to the same one or more transparency levels as the one or more detected level masks, wherein the one or more custom masks are designed based on the predetermined halftone of the printing device;

replacing the one or more level masks in the page description with the corresponding one or more custom masks; and enabling a user to activate and/or deactivate replacement of the one or more level masks with the corresponding one or more custom masks.

13. A printing device, the device comprising:

a halftone library that stores a halftone implemented by the device to produce a plurality of colors having different color values, wherein the halftone includes halftone thresholding arrays used to convert color value information into binary pixel-based information;

a communication port over which the device obtains a page description of an image to be output, wherein the page description includes one or more binary level masks designed to impart corresponding transparency levels to one or more objects in the page description;

a processor that (i) detects the one or more binary level masks in the page description, (ii) determines the one or more corresponding transparency levels of the one or more detected binary level masks, (iii) obtains one or more binary custom masks that correspond to the same one or more transparency levels as the one or more detected binary level masks, wherein the one or more binary custom masks are designed based on the halftone stored by the halftone library, and (iv) replaces the one or more binary level masks in the page description with the corresponding one or more binary custom masks; and an output module that generates a printed copy of the image based on the page description including the one or more binary custom masks.

14. The device of claim 13, further comprising a storage module that stores a plurality of binary custom masks corresponding to a plurality of transparency levels, and wherein the processor obtains binary custom masks from the plurality of binary custom masks stored by the storage module.

15. The device of claim 14, further comprising a download module that downloads binary custom masks to the storage module.

16. The device of claim 13, further comprising a storage module that stores the halftone, and wherein the processor obtains the one or more binary custom masks by determining the one or more binary custom masks based on (i) the transparency levels determined by the level determination module and (ii) a thresholding array of the halftone that is stored by the storage module.

17. The device of claim 13, wherein the one or more binary custom masks are designed to reduce artifacts present in the printed copy of the image caused by beating between the halftone stored in the halftone library and the one or more binary level masks in the page description.

18. A printing device, the device comprising:
a halftone library that stores a halftone implemented by the device to produce a plurality of colors having different color values;
a communication port over which the device obtains a page description of an image to be output, wherein the page description includes one or more level masks designed to impart corresponding transparency levels to one or more objects in the page description;
a processor that (i) detects the one or more level masks in the page description, (ii) determines the one or more corresponding transparency levels of the one or more detected level masks, (iii) obtains one or more custom masks that correspond to the same one or more transparency levels as the one or more detected level masks, wherein the one or more custom masks are designed based on the halftone stored by the halftone library, and (iv) replaces the one or more level masks in the page description with the corresponding one or more custom masks;
an output module that generates a printed copy of the image based on the page description including the one or more custom masks; and
a user interface module that enables a user to activate and/or deactivate the replacement of the one or more level masks in the page description with corresponding custom masks.

* * * * *